United States Patent [19] [11] 3,941,583
Martin et al. [45] Mar. 2, 1976

[54] ILMENITE COATED PELLET AND PROCESS FOR REDUCING SAME

[75] Inventors: Anwyn Margaret Martin, Prahran; Donald Fergusson Stewart, Doncaster; Andrew Baikie Swanson, North Balwyn, all of Australia

[73] Assignee: ICI Australia Limited, Melbourne, Australia

[22] Filed: Nov. 26, 1973

[21] Appl. No.: 419,103

[30] Foreign Application Priority Data
Dec. 4, 1972   Australia............................ 1484/72
Mar. 2, 1973   Australia............................ 2463/73
June 12, 1973  Australia............................ 3613/73

[52] U.S. Cl. ................................................ 75/4
[51] Int. Cl.$^2$.................. C22B 1/245; C22B 34/12
[58] Field of Search ....................................... 75/3–5

[56] References Cited
UNITED STATES PATENTS

| | | | |
|---|---|---|---|
| 791,799 | 6/1905 | Koneman................................. | 75/4 |
| 958,700 | 5/1910 | Glass........................................ | 75/3 |
| 1,193,680 | 8/1916 | Fulton...................................... | 75/4 X |
| 1,994,379 | 3/1935 | Williams et al......................... | 75/3 X |
| 2,291,206 | 7/1942 | Bowes..................................... | 75/1 X |
| 2,453,050 | 11/1948 | Turbett................................... | 75/4 X |
| 2,660,569 | 11/1953 | Reitlenger............................... | 75/3 X |
| 3,215,520 | 11/1965 | Imperato................................. | 75/3 |
| 3,218,153 | 11/1965 | Schei et al.............................. | 75/3 |
| 3,383,199 | 5/1968 | Schmidt.................................. | 75/4 |
| 3,660,073 | 5/1972 | Youngs et al........................... | 75/3 |

FOREIGN PATENTS OR APPLICATIONS

| | | | |
|---|---|---|---|
| 104,564 | 3/1917 | United Kingdom...................... | 75/3 |
| 602,777 | 8/1960 | Canada................................... | 75/3 |
| 157,946 | 1/1921 | United Kingdom...................... | 75/3 |
| 3,314 | 1876 | United Kingdom...................... | 75/4 |

*Primary Examiner*—Allen B. Curtis
*Attorney, Agent, or Firm*—Cushman, Darby & Cushman

[57] ABSTRACT

A pyrometallurgical reductive process characterised in that firstly pellets comprising a mixture of ore and coke precursor are heated in the absence of air so that the coke precursor is converted to coke and secondly the so formed pellets are treated in a subsequent reductive step to obtain as product discrete pellets comprising reduced ore set in a matrix of coke. Preferably the matrix of coke is in the form of an external coating to the pellet.

11 Claims, No Drawings

ILMENITE COATED PELLET AND PROCESS FOR REDUCING SAME

The invention relates to the reductive roasting of ores.

The extraction of the useful values from ores is frequently effected by reductive roasting in a kiln. A suitable reducing agent is carbon in one form or another. It is desirable that the feed material to the reductive roasting is of a close size range and that the shape of its particles is such as to permit controlled flow because thereby the desired process conditions can be more easily maintained. Furthermore it is preferred that the ore to be reduced is intimately mixed with the carbonaceous reductant and it is therefore desirable to pelletise a mixture of the ore and carbonaceous material optionally in the presence of flux materials.

Ores are commonly pelletised by rolling them in the presence of water, and frequently, a binding agent. They may also be agglomerated by means of briquette presses, roll presses or other means of making formed pellets.

The green pellets so formed are, if necessary, dried to give them sufficient mechanical strength to be fed to a subsequent processing step without undue disintegration. They should also have high temperature strength, i.e. they should not break down when being heated to the temperatures required in subsequent pyrometallurgical processes.

In certain processes such as shaft furnace smelting of ores and concentrates, the product of smelting may be a liquid metal or alloy which is tapped from the furnace or a metal vapour which may be withdrawn from the upper end of the furnace. In such a process, the original feed pellets lose completely their original discrete identity. However, it is frequently desirable for the product of the roasting to retain the pellet form so that its flow to subsequent processing stages may be controlled easily.

Hitherto such control has proved difficult as the weight of ore can exert high pressures on the pellets at the bottom of the kiln causing the pellets either to be crushed or to coalesce. In addition pellets made according to the prior art become weaker during the roasting process and hence have an increased tendency to disintegrate after reduction under the forces generated by mechanical handling. The presence of a large proportion of fines in the product from the process can cause the kiln to choke up, impede homogeneous gas flow through the kiln, and also present problems of removal of product from the kiln. We have now found a process of roasting of pellets of ores in which the pellets retain their pellet form and have a greatly reduced tendency either to be crushed or to coalesce.

Accordingly we provide a pyrometallurgical reductive process characterised in that, firstly pellets comprising a mixture of ore and coke precursor are heated in the absence of air so that the coke precursor is converted to coke and secondly the pellets are treated in a subsequent reductive step to obtain as product discrete pellets comprising reduced ore set in a matrix of coke.

The amount of coke precursor must be sufficient to provide excess coke beyond that consumed during the reductive process.

The coking and reductive steps may preferably be carried out in a single kiln unit. Alternatively the coking step may be carried out separately thereby providing pellets of an intermediate product comprising substantially unreduced ore set in a matrix of coke which may be then fed into the reductive step.

In a typical pelletising process ore, preferably in the size range of 10 BSS mesh to fines, coking coal, preferably in the size range 10 BSS mesh to fines, and water are pelletised together in a conventional pan or drum granulator to form green pellets, preferably in the size range ¼ inch to 1 inch. These pellets are dried and either fed to a kiln in which the reduction will take place and the coking coal converted to coke in situ in a preliminary step in the upper portion of the kiln or else the pellets are coked in a separate furnace in the absence of air. This produces a coherent carbon matrix in the pellets. The amount of coke in the pellets depends in part upon the nature of the ore being processed and upon the requirements of the subsequent process but it is preferred that there is at least 20% coke matrix in the pellets fed to the reductive process. We prefer to give adequate strength to the pellets that there is at least 15% coke matrix in the pellets removed from the kiln as product from the process of our invention.

Conventional pelletising aids may be added to the mixture of ore and coke precursor so as to impart strength to the green pellets. Such aids are well known in the art and include for example bentonite, high molecular weight polyacrylamides and starches. Preferably the pelleting aid is organic in origin and will decompose during the coking process. A suitable organic pelleting aid is for example Dinagum, a complex natural polysaccharide added in the range of 0.01% to 1%. (Dinagum is a Trade Mark).

It is a requisite that on coking the coke precursor should form a coherent matrix of coke and not retain its original shape and structure. Thus, some components of the coke precursor must become plastic and incorporate into a continuous structure the remaining rigid components of the coke precursor. This plastic mass must change into a rigid structure on continued heating. By coke precursor we mean throughout this specification a carbonaceous material which on decomposition forms coke.

Typical coke precursors are coking coals, blends of coking coals and non-coking coals; and blends of non-coking coals, chars or cokes with suitable binders such as pitch or fuel oil. Preferably the coke precursor is a coking coal optionally mixed with preformed coke or char.

Coke for the purpose of this invention is defined throughout this specification as an essentially volatile-free firm cellular mass, mostly of carbon, formed by the decomposition of carbonaceous materials.

The form of kiln used in the process of our invention is not critical. Suitable kilns are for example vertical kilns or rotary kilns.

Preferably the reaction is carried out in a counter current feed kiln wherein the pellets are fed through the kiln continuously in one direction while gases are fed through the kiln in the opposite direction. Most preferably the process is carried out in a gravity fed vertical kiln.

The ores suitable for use in this invention are preferably those containing their metal values in the form of oxide minerals, for example, ilmenite, bauxite, laterite, chromite, serpentinite, haematite, magnetite, goethite, limonite, tenorite, cuprite and titano-magnetite.

The process is of particular use in roasting processes in which a pellet feed is used and the pellets are processed without loss of identity but wherein one or more of the components of the pellets liquefy during the roasting treatment. Formation of the liquid phase causes conventional pellets to lose strength during the roasting treatment and allows the pellets to become compacted together to form a coherent plastic mass. However in this process of our invention the coke matrices effectively prevent the pellets from losing their strength or physical identity. The process is of special use in the roasting processes in which a flux is required to be added to the mixture of ore and reducing agents.

By flux we mean a composition comprising at least one alkali metal chloride or alkaline earth metal chloride. Whilst such a flux may comprise a single alkali metal chloride or alkaline earth metal chloride a flux may comprise a mixture of two or more alkali metal chlorides or a mixture of at least one alkali metal chloride with at least one alkaline earth metal salt. A suitable flux may comprise for example sodium chloride alone or alternatively in admixture with one or more other salts such as borax, sodium carbonate, calcium chloride, magnesium chloride, calcium fluoride, calcium sulphate, sodium sulphate, apatite or dolomite. Preferably the flux used in our process is potassium chloride or sodium chloride either separately or in admixture.

Typical fluxed roasting processes giving a solid product and using sodium chloride as flux are, for example, the removal of iron oxide from, for example, low grade manganese ore, vanadium, niobium and tantalum containing slags and concentrates and concentrates of chromite ores.

Preferably the process of our invention is used in the beneficiation of ilmenite and other titaniferous ores to a high grade titanium oxide concentrate which can be used as a substitute for rutile. Titanium metal and titanium oxide pigments are mostly made from either ilmenite or rutile. Ilmenite contains substantial proportions of iron; is soluble in sulphuric acid and is usually converted into titanium oxide by the so-called sulphate process. This sulphate process has however, several disadvantages; amongst these the production of an undesired effluent of sulphuric acid contaminated with iron is particularly objectionable both from the point of view of raw material economy and pollution of the environment.

Naturally occurring rutile has a much lower iron content but is not soluble in sulphuric acid and is thus not suitable as a raw material for the sulphate process. Rutile is normally converted into titanium pigments or metal by the well known so-called chloride process.

As rutile contains only traces of iron the chloride process has the advantage over the sulphate process of not having an iron containing effluent problem.

Known world resources of natural rutile are limited and the rate of extraction of rutile is likely to fall below the demand for use in the chloride process. Supply of ilmenite by contrast is relatively abundant. The present situation is therefore that the raw material available in abundance (ilmenite) is linked to a process with relatively low growth potential (the sulphate process) and the raw material hwich is in scarce supply (rutile) is linked to a process with high growth potential, the chloride process. There is therefore a need for a process of upgrading titaniferous ores, particularly ilmenite, to titanium oxide concentrates containing small amounts of iron and suitable as a substitute for natural rutile in, for example, the chloride process. Several such processes have been suggested; most of these involve reduction of the ore following by removal of the iron by a preferential leaching such as treatment with hydrochloric acid or ferric chloride or selective oxidation of the iron in an acidic medium. The treatment with chlorine compounds or oxidation in an acidic medium is expensive as to raw material consumption and imposes severe corrosion problems; in addition some of these treatments also pose problems with the disposal of effluents.

It is known the ilmenite may be beneficiated by a flux reduction process for producing metallic iron concentrates and titanium oxide concentrates from titaniferous ores, which comprises adding a flux to ore wherein the weight ratio of ore to flux is in the range from 50 : 1 to 1 : 1, preferably in the range from 5 : 1 to 1.2 : 1; most preferably in the range from 2.5 : 1 to 1.4 : 1; heating the mixture in the presence of hydrogen chloride and in the presence of a reducing agent to a temperature below that at which a slag is formed so as to cause formation of metallic iron and separating the metallic iron formed thereby from the titanium oxide by physical means.

The vapour pressure of hydrogen chloride present in the reaction is not narrowly critical thus, for example, it has been found that using a partial pressure of $10^{-5}$ atmospheres the iron particles are larger and more segregated from the relict grains than the particles obtained in the absence of added hydrogen chloride.

Although beneficial results may be obtained using smaller concentrations of hydrogen chloride it is preferred that the partial pressure of hydrogen chloride in the atmosphere surrounding the reaction mixtures is maintained above $10^{-4}$ atmospheres most preferably between 0.05 and 0.4 atmospheres.

The optimum partial pressure of hydrogen chloride depends on the ore and the temperature used in the process.

The amount of hydrogen chloride added to the reaction is not narrowly critical as the hydrogen chloride to some extent appears to be regenerated during the course of reduction.

We have found in the reduction process using pellets comprising ilmenite and flux not having a coke matrix in the presence of carbonaceous material that on roasting in a vertical kiln the pellets become weak and form a coalesced plastic mass blocking the kiln due to the fusion of the flux at the reaction temperature. We have now found that pellets prepared from a mixture of ilmenite, flux and coke precursor which have been treated by the process of our invention to convert the coke precursor to a coke matrix do not suffer from this disadvantage and may be reacted in a vertical kiln.

Accordingly in a preferred aspect of our invention we provide an improved process for producing metallic iron concentrates and titanium oxide concentrates from titaniferous ores which process comprises adding a flux to the ore and wherein the weight ratio of ore to flux is in the range from 50:1 to 1:1, preferably in the range from 5:1 to 1.2:1; most preferably in the range from 2.5:1 to 1.4:1; heating the mixture in the presence of hydrogen chloride and in the presence of a solid carbonaceous material to a temperature below that at which a slag is formed so as to cause formation of metallic iron and separating the metallic iron formed thereby from the titanium oxide by physical means, said improvement characterised in that the mixture of ore, flux and solid carbonaceous material is in the form of a pellet of a mixture of ilmenite and flux set in a matrix of coke and the pellets of reduced ore obtained as product in the process comprise at least 15% coke. The pellets used as feed are prepared from a mixture comprising ilmenite, coke precursor and flux in the manner described hereinabove either separately or in the top of the reducing furnace.

The exact composition of the pellets before coking is not narrowly critical but preferably the w/w percentage of ilmenite in the dried pellet is in the range from 5 to 50, preferably 30 to 50, the w/w percentage of flux is in the range from 5 to 30, preferably 15 to 30 and the w/w percentage of coke precursor is in the range from 30 to 90, preferably 30 to 50.

In a further aspect of our invention we provide a coated pellet comprising a core consisting of a suitable reaction mixture for a metallurgical reductive process and a coke matrix skin around the core wherein the coke matrix substantially completely surrounds the core.

The core of these coated pellets may consist of any suitable mixture of ores and solid reducing materials optionally in the presence of other additives such as fluxes known to those skilled in the art. Thus the core may comprise a mixture of finely ground iron oxide mixed with sufficient ground char to metallize the iron oxide.

We have found the coated pellets of the preferred aspect of our invention are of especial use in the beneficiation of ilmenite because although ilmenite/flux pellets containing large amounts of coke matrix are very strong and are suitable for treatment in a vertical kiln, the segregation of the iron values from the non-reduced non-ferrous metal is hindered by the presence of large amounts of coke. This problem may be overcome by using pellets comprising discrete portions of low carbon content in which the segregation reaction can occur interspersed with portions of high carbon content to give the pellet strength. In a most preferred aspect of our invention the ilmenite flux pellets comprise a core having the carbon content necessary for maximum segregation surrounded by an external coke matrix sufficient to give the required strength. Such pellets may be easily prepared by coating a preformed pellet containing a small amount of solid carbonaceous material with a layer of coke precursor and subsequently converting the coke precursor to coke.

A further general advantage of the coated pellets is that the reduced ore obtained by the reductive roasting treatment contained within the pellet is protected from oxidation by the surrounding coke layer. Also as no flux is present initially in the outer layer of the pellet, stickiness within the kiln is reduced and there is little tendency for the pellets to agglomerate during the roasting treatment. The coated pellets obtain their strength from the external coke skin matrix and therefore this has the advantage that the core of the pellet may be made up to give optimum results in the metallurgical treatment without regard to strength. Thus although the core of the pellet may comprise as solid carbonaceous material a coke precursor or a coke matrix preferably the core of the pellet comprises a non-binding solid carbonaceous material such as for example ground coke, ground char or graphite. Preferably the core of the pellet prior to coking comprises sufficient solid carbonaceous reductant to achieve metallization of the iron or other metal to be reduced present in the core. We have found that this requires a small excess over the theoretical requirement. Thus for a typical ilmenite ore containing 31% w/w of iron we prefer to maintain the weight ratio of solid carbonaceous material in the core of the pellet to ore between 0.1:1 and 0.3:1 most preferably between 0.12:1 and 0.25:1. Preferably the weight ratio of flux to ilmenite in the core of the pellet is in the range from 1:5 to 1:1.2 most preferably 1:2.5 to 1:1.4. Optionally in the case of ilmenite the core of the pellet may also contain a source of hydrogen chloride suitably ferrous chloride.

Other additives known to those skilled in the art may also be present in the core.

The nature of the coke skin comprising the external coke matrix on the pellets in the preferred aspect of our invention is not narrowly critical as long as there is sufficient matrix for the pellet to retain physical identity during the reductive roasting process. Thus satisfactory pellets may be made wherein there is sufficient coke matrix to give the pellet strength at the end of the reductive roasting.

The nature of the coke matrix skin of our coated pellets is substantially independent of the nature of the core of the pellets. Although in certain circumstances liquid components of the core may be absorbed by the skin the effect of this on the metallurgical process is thought to be small. Conditions for forming coke skins found satisfactory in ilmenite beneficiation may be used for other metallurgical reductive roasting processes. In general we have found that improved results in the reductive roasting processes may be obtained by careful attention to the exact nature of the coke skin around the pellet. We have found that it is important for high efficiency that the coke skin is not cracked or fissured and that the skin does not crack or collapse under thermal stress but the pellet retains its physical identity during the reductive roasting. We have also found it desirable that the flux does not exude from the pellet causing stickiness and agglomeration of pellets. The important factors influencing the nature of the coke skin are 1. size of the pellets
2. thickness of the layer of coke precursor used in forming the skin
3. nature of the coke precursor used in forming the skin
4. conditions of coking The size of the core of the pellets is not narrowly critical. We have found that for most processes a convenient core size is in the range from 0.25 cm to 5 cm diameter preferably from 0.5 cm to 2.5 cm.

The thickness of coke skin around the pellets to give the pellets strength is directly proportional to the diameter of the core. The amount of coke skin required at the start of the reductive process also depends on the conditions under which the pellet is treated. Processes in which the pellets have to withstand large forces and/or in which a large proportion of the coke matrix skin is consumed must initially have a thicker coating of coke. Satisfactory thicknesses of coke skin for any specific process may be found by simple experiment. However for normal vertical kiln operation it has been found that satisfactory ratios of skin thickness to core diameter are in the range from 1:10 to 3:10 preferably 2.1:10 to 2.3:10 The ratio may require increasing if the pressures generated in the vertical kiln are higher than normal and may be decreased if the pressures are lower. The nature of the coke precursor used for coating the pellets is not narrowly critical; however we have found that when coking coal is used as the coke precursor that the pellets have a tendency to crack under thermal stress. In a preferred embodiment of our invention the pellets are coated with the coke precursor comprising powdered coke or other inert materials preferably carbonaceous in admixture with a coke precursor such as coking coal. We have found that pellets coated with a mixture of coking coal and inert material in a ratio in the range from 1:2 w/w to 9:1 w/w have a reduced tendency to crack under thermal stress. The nature of the inert material is not critical; for example a suitable source of inerts is the recycle coke obtained in the process but other types of coke, coal chars or graphite may also be used. Non-carbonaceous inert material may also be used; suitable inert material is for example fly ash, coke clinker, ceramics such as crushed brick, beach sands such as ilmenite, aluminium and cement clinker. Throughout this specification the term inerts is used to mean the inert material that is mixed with the coking coal.

The heating rate during the coking stage is the factor having the greatest influence on the properties of the coked pellet skin, although its effect can be very much reduced by variations in skin composition. Fast heat-up rates generally produce very porous, swollen skins, submetallic in appearance and highly resistant to abrasion: in extreme cases pellets may be highly deformed and welded into a single mass with little inter-pellet voidage remaining. As heat-up times increase swelling is reduced and shrinkage may even occur, pellets become denser, blacker and duller, deformation and sticking disappear and resistance to abrasion is lowered. Coking should be preferably carried out in an inert or reducing atmosphere suitably carbon dioxide, nitrogen, carbon monoxide, hydrogen, steam or mixtures thereof.

We have found that the addition of a non-coking component such as preformed ground coke or coal char as a diluent to the skin composition progressively diminishes the importance of heat-up rate as its proportion increases, by reducing swelling, sticking, deformation and rupture. Beyond certain levels, however, depending on the nature of the coal, char or other inerts addition causes weakening of the skins. The slower the heat-up rate, the lower is the level of inerts which can be tolerated without fall-off in strength.

The size of the inerts appears to have only a minor effect on the properties of the coated pellet. In general we prefer to use an inert of such size that 50% passes through a 60 BSS mesh. However we have found if very coarse inert material is used that it is difficult to find suitable coking conditions which ensure that the coke matrix formed from the coke precursor envelops the inerts and thus the skin tends to be weak.

The degree to which the coking coal is ground also has important effect on the skin properties. Fine-grinding appreciably reduces swelling, sticking, deformation etc., and has the ability, under the appropriate conditions of heat-up rate and/or inerts addition to yield smooth, dense very resistant skins within which inerts particles can be tightly incorporated. The absolute level of inerts acceptance is, however, lowered by fine-grinding of the coking coal.

When using a fast heat-up rate (i.e. between 50 and 200°C a minute) coal gound so that 50% passes a 100 BSS sieve can accept at least 50% of char without significant loss of strength whereas coal ground so that 80% passes a 100 BSS sieve can accept less. With a slow heat-up rate (i.e. between 5° and 25°C a minute) the percentage of char acceptable by finely ground coal drops to between 30 and 40%.

We believe that the behaviour of the coated pellets may be explained by the theory given below, however, we do not wish to be limited in any way by this theory which is only put forward as an aid to understanding the invention.

It is known that during the coking procedure coal passes firstly through a temperature region (350° – 415°C) in which some components become fluid and subsequently through a region (400° – 460°C) in which there is a rapid evolution of volatiles. If the temperature of gas evolution is reached before decomposition has caused the fluid components formed at the lower temperature to resolidify, a foam of low viscosity will form. This foam has the ability to surround and incorporate particles of inert material such as char; on resolidification these rigid particles add strength to the residual carbon skeleton left by the foam. Hence inerts addition, combined with fast heat-up rates leads to strong skins.

At extremely high rates of heating, gas generation at the surfaces of the particles within the coal layer may be more rapid than its ability to escape from the skin, causing the skin to swell and deform. Inert particles such as char by providing extra channels for gas escape, not blocked by plastic materials, reduce the swelling and deformation, and are therefore beneficial.

Conversely if heating is slow gas can escape as fast as it is formed so that swelling will not occur or will be much less. The incorporation of rigidity — conferring inerts will, however, be much more difficult and these particles will act instead as discontinuities reducing strength.

It is thought that finer grinding of the coal, although lowering the absolute porosity of the skin, provides an increase in the number of pores. At the same time it increases the surface area of the coal exposed during subsequent drying and other operations and therefore may cause the coal to become more oxidized than when less finely ground. For either of these reasons the foaming and hence swelling tendency of the skin would be reduced: in the former case because of provision of more channels for gas escape, in the latter because a reduction in fluido-plastic constituents would cause blocking of fewer channels. It cannot be said with certainty at present which mechanism, if either, is responsible.

The most suitable coking coals for use as the coke precursor are high fluidity, low volatile coking coals. The particles of such coals, when ground, have the ability to coalesce into strong coke matrices, capable of incorporating appreciable proportions of inert particulate material, without an excessive tendency to swelling.

It is also important that these coals are used within a comparatively short time of their extraction from the mine e.g. about 1 month in the case of the South Bulli coal used in Example 9. This is because aerial oxidation causes progressive reduction of fluidity so that the ability of the fine coal particles to coalesce with themselves and with particles of inert material to form a strong matrix during coking diminishes. Swelling, however, which is dependent on the evolution of volatiles during coking is not comparably affected.

In commercial operation of the process of our invention wherein the coke is formed in situ in the reductive roasting kiln the rate of heating during the coking stage is largely determined by factors outside the immediate control of the operator.

If a rapid rate of heating (between 50°–200°C per min) occurs during the coking stage we prefer to use a skin composed of coke derived from a mixture of coking coal and between 40 and 50 w/w% of inerts.

If the rate of heating is slow (between 5°–25°C per min) then we prefer to use a skin composed of coke derived from a mixture of coking coal and between 10 and 30 w/w% of inerts.

A small increase in efficiency is achieved if coarsely ground coal is used for fast heating and if finely ground coal is used for slow heating.

For intermediate rates of heating preferred conditions may be calculated by extrapolation of the results shown in the examples.

The invention is illustrated by but by no means limited to the following examples.

EXAMPLE 1

This example illustrates pellet preparation procedures. A West Australian beach sand ilmenite of the particle size distribution set out in Table I was mixed dry with a medium quality coking coal of the particle size distribution also shown in Table I. The ilmenite to coal weight ratio was 3 : 2. Dinagum, a natural complex polysaccharide, was added at a level of 0.2% by weight of the total mix followed by water, 14% by weight, and the whole well mixed. The uniformly damp solid was formed into pellets of between one-fourth inch and one-half inch diameter on a pelletizing disc. After drying, the pellets were heated to 825°C in the absence of air and held at that temperature until evolution of volatiles had ceased. On cooling the pellets were found to be hard with a silvery surface sheen characteristic of coke. Microscopic examination revealed that each pellet consisted of a porous matrix of coke in which ilmenite grains were rigidly held in intimate contact with the coke.

TABLE I

| PARTICLE SIZE DISTRIBUTIONS, WEIGHT PER CENT | | |
|---|---|---|
| MESH SIZE BSS | ILMENITE | COAL |
| + 72 | 9.4 | 0 |
| − 72 + 100 | 46.6 | 3.3 |
| − 100 + 150 | 40.5 | 8.2 |
| − 150 | 3.5 | 88.5 |

EXAMPLE 2

This example illustrates the use of green strength additives. The pellet preparation procedure of Example 7 was repeated with the replacement of Dinagum with Guartec F (Trademark for a natural polysaccharide of the guar gum type). After drying, these pellets, pellets containing Dinagum and pellets containing no gum were tested in an attrition apparatus consisting of a rotating drum fitted with a lifter bar. This tests the ability of pellets to withstand repeated impacts and rolling contact. Results are set out in Table II.

TABLE II

| PELLET BINDER | FINES % AFTER TEN REVOLUTIONS |
|---|---|
| None | 100 |
| Dinagum 6005 0.2% | 22 |

TABLE II-continued

| PELLET BINDER | FINES % AFTER TEN REVOLUTIONS |
|---|---|
| Guartec F, 0.2% | 20 |

EXAMPLE 3

This example illustrates coking precedures. The pellet preparation procedures of Example 7 were followed with a mixture of the tabulated composition, expressed in w/w percentage.

| Ilmenite | 30 |
|---|---|
| Coal | 50 |
| Sodium Chloride | 19.8 |
| Guartec F | 0.2 |

After drying, samples of these pellets were coked in the absence of air for ten minutes at different temperatures. When cool the pellets were subjected to the attrition test of Example 2.

It was found that pellets coked at temperatures less than 500°C broke down completely to fines in the attrition test. Those coked at temperatures of 700°C and above generated only around 10% fines. There was no substantial improvement by coking at temperatures much greater than 750°C.

EXAMPLE 4

Pellets of different compositions made according to the procedures of Example 7 were coked at 750°C in a $CO/N_2$ atmosphere and subject to attrition testing. Typical results are set out in Table III.

TABLE III

| No. | Composition (w/w percent) | | | Attrition |
|---|---|---|---|---|
|  | Ilmenite | Salt | Coal | (% fines) |
| 1 | 45.5 | 20.6 | 33.9 | 21 |
| 2 | 39.1 | 20.2 | 40.7 | 14 |
| 3 | 28.2 | 21.9 | 49.9 | 5 |

EXAMPLE 5

This example illustrates reductive processing. A sample of the pellets prepared in Example 4, No. 2, was fed to a vertical kiln heated to 1,200°C.

At regular intervals pellets were withdrawn from the bottom of the kiln by a sliding grate mechanism. Fresh pellets at room temperature were added to the top of the kiln to maintain a constant level. A reducing atmosphere of carbon monoxide and hydrogen mixed with nitrogen was maintained in the kiln. The temperature of the discharged pellets was 250°C. Thus, during their passage through the kiln, pellets were heated to 1,200°C with liquefaction of the flux, held at that temperature while passing through a zone of constant temperature, and cooled back to close to room temperature with solidification of flux. At the same time they were supporting a column of incoming pellets of progressively increasing weight.

The product was substantially discrete and uncrushed pellets. Microscopic examination of the product pellets showed that the pellets still comprised a matrix of coke in which were set particles of reduced ilmenite, surrounded by salt crystals.

A portion of the pellets was lightly crushed and the resultant product was washed and magnetically separated into two fractions without further grinding. The non-magnetic fraction was found by microscopic examination to be substantially all coke. The magnetic fraction was found to be grains of anosovite, a lower oxide of titanium, throughout which were distributed specks and accretions of metallic iron.

EXAMPLE 6

The procedures of Example 5 were repeated exactly except that hydrochloric acid gas at a level of 2% by volume of the total kiln gas flow was introduced into the hot zone of the furnace.

The crushed product pellets were treated in a flotation cell using kerosene as collector in order to remove the residual coke. The flotation tails were then subjected to a magnetic separation step which yielded an iron-rich magnetic fraction and a titanium-rich non-magnetic fraction. Microscopic examination of the unseparated flotation tails revealed that there was substantial movement of iron from within the anosovite grains thereby enabling the magnetic separation to be made. The iron-rich fraction analyzed 37 iron and 50% titanium dioxide and contained 71% of the iron. The titanium-rich fraction, after calcination analyzed 15 iron and 80% titanium dioxide and contained 46% of the titanium values.

EXAMPLE 7

The following examples illustrated the preparation of coated pellets and their reductive processing.

The pellet preparation procedures of Example 1 were followed with a mixture of the tabulated composition, expressed in w/w percentage

| Ilmenite | 57 |
|---|---|
| Coal | 15 |
| Sodium Chloride | 27.8 |
| Guartec F | 0.2 |

After drying, the pellets were returned to the pelletizing disc. There, by successive wettings and powder additions, a layer of coal mixed with 0.2% Guartec F was built up to a thickness of one-eighth inch. After further drying, these coated pellets were coked at 750°C.

The coked pellets were then fired in a vertical kiln according to the procedures of Example 5. The crushed product pellets were subjected to flotation and magnetic separation, as described in Example 5.

The iron rich fraction analyzed 39% iron and 47% titanium dioxide and contained 75% of the iron. The titanium-rich fraction analyzed 8.4% iron and 88% titanium dioxide and contained 40% of the titanium values.

EXAMPLE 8

This example compares the thermal properties of pellets coated with coking coal and pellets coated with a coal/coke mixture. The pellets were prepared by the general preparation procedures of Example 1 using a mixture of the tabulated composition, expressed in w/w percentage

| Ilmenite | 57 |
|---|---|
| Coal | 15 |
| Sodium Chloride | 27.8 |
| Guartec F | 0.2 |

After drying, the pellets were returned to the pelletizing disc. There, by successive wettings and powder additions, a layer of coke precursor mixed with 0.2% Guartec F was built up to a thickness of 2 mm. After further drying, these coated pellets were coked at 750°C.

Pellets were prepared firstly using as coke precursor a good quality coking coal having the following size range:

| Mesh Size (B.S.) | Wt. % |
|---|---|
| + 72 | 5.2 |
| − 72 + 100 | 12.3 |
| − 100 + 150 | 16.3 |
| − 150 | 66.2 |
| | 100.0 |

A second sample of pellets was prepared using as coke precursor a 50:50 w/w mixture of the good quality coking coal with finely divided coke. A sample of each of the pellets was heated separately from room temperature to 1,000°C in the absence of air over a period of 45 minutes and allowed to cool.

The pellets prepared using coal alone had multiple deep fissures penetrating through to the core through which molten salt had exuded causing the mass of pellets to stick together. By contrast the pellets prepared using coal-coke retained a coherent skin and there was no sign of salt exudation and the product was obtained as discrete pellets. In further experiments it was found that with pellets using coal alone the speed of coking is critical whereas using the coal/coke pellets the conditions of coking were not critical.

EXAMPLE 9

This example illustrates the effect of composition of coke precursor and conditions of coking on the coke skin.

The coal used in this Example was a high fluidity, low volatile coking coal from the South Bulli colliery in N.S.W. having a proximate analysis of:

| Inherent moisture | 1.2% w/w |
|---|---|
| Ash | 10.7% w/w |
| Volatile matter | 21.9% w/w |
| Fixed carbon | 66.2% w/w |

The pellet preparation procedures of Example 1 were repeated with a mixture of the tabulated composition expressed as w/w percentage.

| Ilmenite | 57 |
|---|---|
| Coal | 15 |
| Sodium chloride | 27.8 |
| Guartec F | 0.2 |

The pellets were in the size range 0.8 to 1 cm in diameter.

After drying the pellets were returned to the pelletizing disc. There by successive wetting and powder additions a layer of coke precursor with 0.2% Guartec F was built up to a thickness of 2 mm. After further drying these coated pellets were coked at 750°C in an atmosphere of nitrogen.

The experiment was repeated with various mixtures of coke precursor and with varying conditions of coking. Table IV shows the composition of the coke precursor and the rate of heating during the coking stage. The properties of the resultant pellet are also shown in Table IV.

TABLE IV

| Exp No. | Composition of Coke Precursor | | | | **Pellet characteristics after coking at 750°C | | | | Coked Pellet Strength | | Appearance after Heating at 950°C | |
|---|---|---|---|---|---|---|---|---|---|---|---|---|
| | *Particle Size of Coal | Nature of Inert | Ratio Coal/Inert | Rate of Heating to 750°C | Deformation | Rupture | Fusion | Texture | Abrasion Test | Shatter Test | Cracking | Salt Exudation |
| 1 | A | Brown Coal Char (40% −150μ) | 1:0 | 100°C/min | 4 | 6 | 4 | Hard, very rough | — | — | — | — |
| 2 | " | | 1:0 | 6°C/min | 3 | 5 | 5 | Hard, very rough | — | — | — | — |
| 3 | " | | 9:1 | 100 | 3 | 3 | 5 | Hard, very rough | — | — | None | None |
| 4 | " | | 9:1 | 6 | 2 | 2 | 2 | Hard, very rough | Resistant | Strong | None | Appreciable |
| 5 | " | | 4:1 | 100 | 2 | 3 | 4 | Hard, rough | — | — | None | None |
| 6 | " | | 4:1 | 6 | 1 | 1 | 1 | Hard dense | Resistant | Strong | None | None |
| 7 | " | | 3:2 | 100 | 1 | 3 | 1 | Hard, rough | Slightly abraded | Strong | None | None |
| 8 | A | Brown Coal Char (40% −150μ) | 1:1 | 100 | 1 | 2 | 1 | Hard, rough, moderate density | Mildly abraded | Strong | None | None |
| 9 | " | | 1:1 | 6 | 1 | 1 | 1 | Rough, not dense | Readily abraded | Very weak | — | — |
| 10 | " | | 2:3 | 100 | 1 | 1 | 1 | Soft, rough | Readily abraded | Weak | — | — |
| 11 | " | | 2:3 | 6 | 1 | 1 | 1 | Very soft, rough | Readily abraded | Very weak | — | — |
| 12 | B | Brown Coal Char (40% −150μ) | 1:0 | 100 | 3 | 3 | 5 | Hard, very rough | — | — | — | — |
| 13 | " | | 1:0 | 6 | 2 | 2 | 2 | Hard, very rough | Resistant | Strong | None | Appreciable |
| 14 | B | Brown Coal Char (40% −150μ) | 9:1 | 100 | 2 | 3 | 4 | Hard, rough | — | — | Severe, deep | Appreciable |
| 15 | " | | 9:1 | 6 | 1 | 1 | 1 | Hard, dense | Resistant | Strong | None | Minor |
| 16 | " | | 4:1 | 100 | 2 | 2 | 3 | Hard, dense | " | " | " | " |
| 17 | " | | 4:1 | 6 | 1 | 1 | 1 | Hard, dense, rather smooth | " | " | " | None |
| 18 | " | | 3:2 | 100 | 1 | 2 | 1 | Hard, dense, rather rough | Slightly abraded | Strong | None | None |
| 19 | " | | 1:1 | 100 | 1 | 1 | 1 | Hard, dense rather rough | Mildly abraded | Strong | None | None |
| 20 | " | | 1:1 | 6 | 1 | 1 | 1 | Not dense, rough | Readily abraded | Very weak | — | — |
| 21 | B | Brown Coal Char (40% −150μ) | 2:3 | 100 | 1 | 1 | 1 | Soft, rough | Readily abraded | Weak | — | — |
| 22 | " | | 2:3 | 6 | 1 | 1 | 1 | Soft, rough | Readily abraded | Very weak | — | — |
| 23 | B | Foundry Coke (30% −150μ) | 9:1 | 100 | 2 | 4 | 2 | Very hard & dense | Resistant | Strong | None | Appreciable |
| 24 | " | | 9:1 | 6 | 1 | 1 | 1 | Very hard & dense, smooth | Resistant | Strong | None | Minor |
| 25 | " | | 3:2 | 100 | 1 | 1 | 1 | Very hard & dense rather rough | Mildly abraded | Strong | None | None |

TABLE IV-continued

| Exp No. | Composition of Coke Precursor | | | Rate of Heating to 750°C | **Pellet characteristics after coking at 750°C | | | | Coked Pellet Strength | | Appearance after Heating at 950°C | |
|---|---|---|---|---|---|---|---|---|---|---|---|---|
| | *Particle Size of Coal | Nature of Inert | Ratio Coal/Inert | | Deformation | Rupture | Fusion | Texture | Abrasion Test | Shatter Test | Cracking | Salt Exudation |
| 26 | '' | Recycle coke (67% −150μ) | 9:1 | 100 | 2 | 5 | 3 | Very hard & dense | Resistant | — | None | Appreciable |
| 27 | '' | | 9:1 | 6 | 1 | 1 | 2 | Very hard & dense, smooth | Resistant | Strong | None | Very Minor |
| 28 | B | Recycle coke (67% −150μ) | 3:2 | 100 | 1 | 1 | 1 | Very hard & dense, smooth | Mildly abraded | Somewhat weak | Rare superficial | Very minor |
| 29 | C | Brown Coal Char (40% −150μ) | 1:0 | 100 | 3 | 4 | 5 | Hard, very rough | — | — | — | — |
| 30 | '' | | 1:0 | 6 | 1 | 1 | 1 | Very hard & dense, smooth | Resistant | Strong | Slight superficial | Appreciable |
| 31 | '' | | 9:1 | 100 | 3 | 4 | 3 | Very hard & dense | — | — | Severe, deep | Appreciable |
| 32 | '' | | 9:1 | 6 | 1 | 1 | 1 | Very hard & dense, smooth | Resistant | Strong | None | Appreciable |
| 33 | '' | | 4:1 | 100 | 2 | 2 | 2 | Very hard & dense, rather smooth | Resistant | Strong | Severe, deep | Minor |
| 34 | C | Brown Coal Char (40% −150μ) | 4:1 | 6 | 1 | 1 | 1 | Very hard & dense, smooth | Resistant | Strong | None | None |
| 35 | '' | | 3:1 | 100 | 1 | 1 | 1 | Very hard & dense, smooth | Slightly abraded | Strong | Moderate | Minor |
| 36 | '' | | 7:3 | 100 | 1 | 1 | 1 | Very hard & dense, smooth | Mildly abraded | Strong | Superficial | Very minor |
| 37 | '' | | 7:3 | 6 | 1 | 1 | 1 | Hard, dense, smooth | Mildly abraded | Strong | None | None |
| 38 | '' | | 13:7 | 100 | 1 | 1 | 1 | Hard, dense smooth | Mildly abraded | Strong | None | Very minor |
| 39 | '' | | 3:2 | 100 | 1 | 1 | 1 | Hard, dense rather rough | Mildly Strong abraded | None | Virtually none | |
| 40 | C | Brown Coal Char (40% −150μ) | 3:2 | 6 | 1 | 1 | 1 | Dense, rather rough | Mildly abraded | Weak | None | None |
| 41 | '' | | 1:1 | 100 | 1 | 1 | 1 | Moderately dense, rather rough | Mildly abraded | Weak | None | None |
| 42 | '' | | 1:1 | 6 | 1 | 1 | 1 | Soft, rough | Readily abraded | Very weak | — | — |

Notes on Table IV
*Particle size of coal

| B.S.S. Mesh | Cumulative % Passing | | |
|---|---|---|---|
| | A | B | C |
| 52 | 85.0 | | |
| 60 | 80.5 | | |
| 72 | 67.1 | 83.6 | 96.5 |
| 100 | 52.0 | 69.3 | 88.7 |
| 150 | 40.0 | 55.4 | 75.3 |
| 200 | 31.5 | 44.9 | 61.0 |
| 300 | 23.7 | 34.4 | 45.8 |

TABLE IV-continued

| Exp No. | Composition of Coke Precursor | | | Rate of Heating to 750°C | **Pellet characteristics after coking at 750°C | | | | Coked Pellet Strength | | Appearance after Heating at 950°C | |
|---|---|---|---|---|---|---|---|---|---|---|---|---|
| | *Particle Size of Coal | Nature of Inert | Ratio Coal/ Inert | | Deform-ation | Rup-ture | Fus-ion | Texture | Abrasion Test | Shatter Test | Crack-ing | Salt Exudation |
| 350 | 20.6 | 28.8 | 37.8 | | | | | | | | | |

**Deformation
4 = Extreme
3 = Considerable
2 = Slight
1 = None
Rupture
6 = Extreme
5 = Considerable
4 = Moderate
3 = Slight
2 = Very slight, superficial
1 = None
Fusion
6 = Almost total fusing, loss of identity
5 = Severe fusing into solid mass
4 = Appreciable strong fusing in clusters
3 = Mild sticking of small groups
2 = Slight sticking at contact points
1 = No sticking, free flowing

EXAMPLE 10

This example illustrates that if the inert carbonaceous material is too coarse weakening of the coked skin will result.

Following the general procedure of Example 9 certain experiments were repeated using brown coal char of a coarser grade.

Brown coal char of particle size 43%, +500μ was used to form skins with South Bulli coal of particle size C (see table IV) in the ratio of (a) 7 : 3 and (b) 4 : 1; coal : char. When coked at both 6°C/min and 100°C/min the resulting pellets, although adequate in other respects and of similar appearance to corresponding pellets made with char of particle size 40%, — 150μ (see Table IV,) were comparatively much weaker.

EXAMPLE 11

This example illustrates the advantage of having pellets with a coke matrix or coke coating over those without such systems.

The pellet preparation procedures of Example 1 were followed using a feed of the following composition, expressed in w/w percentages.

| | |
|---|---|
| Ilmenite | 38 |
| Sodium chloride | 20 |
| Potassium chloride | 3.5 |
| Wood charcoal | 38.5 |

After drying, the pellets were fed to the laboratory scale vertical kiln as described in Example 5. The hot zone was maintained at 1,200°C and initially the kiln was charged with ¼ - ½ inch lump char. As this char was removed from the bottom of the kiln, pellets of the above composition were added to the top. Thus, pellets were lowered into the kiln and their temperature was gradually increased through the melting point of the chloride mixture (approx. 770°) up to 1,200°C.

When substantially all of the char had been withdrawn, no further material was found to move down the kiln into the product discharge mechanism and no further addition of fresh pellets could be made to the top of the kiln.

After allowing the kiln to cool back to room temperature, its contents were examined. Pellets were found to have totally disintegrated and lost identity giving a solid mass of reduced ilmenite and residual wood char bound together with solidified chloride flux. The cessation of pellet discharge had occurred when the partially liquid kiln burden had reached the point corresponding to the solidification temperature of the chloride flux. The wood charcoal not being a coke precursor and having no coking properties had been unable to supply the necessary bonding required to maintain pellet identity throughout the temperature regime in the kiln. Accordingly, when the temperature reached the chloride melting point, the pellets became soft and collapsed, filling the interpellet voidage and destroying their desirable free-flowing properties.

EXAMPLE 12

The following example illustrates the disadvantage of using high proportions of preformed coke or char when the rate of heating is slow.

Pellets made according to the procedures of Example 7 were returned to the pelletizing disc, as in Example 7, and coated with a mixture of one part of coal to one part to one part of brown coal char, 40% −150μ, to form a pellet of about 1.4 cm diameter (as in Example 9; Table IV Experiment 20). These pellets were then charged to the laboratory scale vertical kiln. The working volume of this kiln, approximately 5.6 liters, consists of an electrically heated vertical metal tube 10 cm inside diameter and 76 cm long. The temperature profile when the temperature controller is set at 1,200°C was quite simple. There is a linear increase down the tube from room temperature to 1,200°C, this being reached at 33 cm from the top. From 33 cm to 48 cm, there is a zone of constant maximum temperature, constant to ±10°C. From 48 cm to the discharge, the temperature decreases linearly to about 150°C. At this point in the kiln there is a sliding ring discharge mechanism which is operated intermittently to remove 250 ml portions of pellets. In order to achieve a residence time in the kiln hot zone of about two hours, product has to be discharged every 20-25 minutes.

Thus in this particular kiln, the length of the zone of constant maximum temperature and the process requirement of about two hours residence time in this zone combine to fix the rate of heat up of pellets to reaction temperature. The rate in this case is approximately 6½°C/min.

Pellets made with the composition described above were discharged at the bottom of the kiln as a mixture of whole pellets, broken pellets and powder. Broken pellets and powder were sieved from whole pellets on a ¼ inch screen, weighed and reported as "fines". These fines represented 41% of the total yield from the kiln. This large proportion indicates that at 6½°C/min heating rate, the given skin composition is inadequate to yield a satisfactory pellet strength.

Too many fines in a directly fired kiln will cause a maldistribution of combustion gases in the bed and hence hot spots and "rat holing" with resultant uneven product quality.

In the small indirectly heated kiln, product quality is not so drastically affected by breakdown since heat is supplied through the kiln rather than by transfer from the gas. A whole pellet from this run was mounted in epoxy resin and examined by optical microscopy. The core material was found to consist of reduced iron set in a matrix of sodium chloride, excess carbon and anosovite

EXAMPLE 13

The following example illustrates the disadvantage of using coarsely ground coal without incorporation of preformed powdered coke.

Pellets were made according to the procedures of Example 9. Their coating material was pure coal (Table IV Experiment 2). These were processed through the laboratory vertical kiln according to the procedures of the previous example. Flow of the pellets through the kiln was erratic with variable volumes of pellets being discharged. Eventually, pellets bridged inside the kiln and flow ceased entirely. After allowing the kiln to cool back to room temperature, its contents were examined.

Pellets were found to be badly distorted with substantial deformation and rupture of the skins. There had been fusion of pellets to their neighbours resulting in the formation of "bunches of grapes" with, in some cases, total loss of individual pellet identity. Cessation of discharge resulted from plugging of the kiln by a fused mass of coke and core debris.

A sample of this fused mass was crushed, washed with hot water to remove salt and dried. It was then subjected to a hand magnetic separation yielding magnetic and non-magnetic fractions. Small representative portions of these fractions were mounted in epoxy resin and examined by optical microscopy. The non-magnetic fraction was substantially all coke, mixed with a few anosovite and unreduced grains. The magnetic product consisted almost entirely of ilmenite in various stages of reduction ranging from non-metallization through to apparently complete metallization. No effective magnetic iron-titanium separation was possible.

EXAMPLE 14

The following examples illustrate the advantage of incorporation of a preformed coke or char in reducing cracking and salt exudation.

Pellets were made according to the general procedures of Example 9. Half were coated with fine ground coal alone (Table IV, Experiment 30), and half were coated with a mixture of fine ground coal and brown coal char in the weight ratio four to one (Table IV, Experiment 34).

The latter pellets were processed through the laboratory vertical kiln entirely without incident. Discharge from the kiln base was regular and trouble free and pellets in the discharge tray were whole, and free of visible salt exudations. The pellets with char free skins, however, were erratic to discharge, with many pellets showing surface cracks and resolidified salt droplets on the surface. After processing less than two kiln volumes discharge ceased. After allowing the kiln to cool back to room temperature, its contents were examined. Blockage was found to have occurred due to the progressive formation of a mass of pellets welded together with resolidified salt in the lower portion of the kiln. It was apparent that cracked pellets, wet with molten salt but still whole, had moved out of the zone of maximum temperature and cooled down through 800°C to about the resolidification temperature of salt. At this point in the kiln they readily stuck to the kiln wall and their neighbours, causing a bridge to form and terminating flow.

By contrast, the pellets coated with a mixture of coal and char (4:1 w/w) had discharged uniformly and freely as described above.

In both cases, microscopic examination of the pellets revealed that reduction of ilmenite to a mixture of metallic iron and anosovite was complete.

EXAMPLE 15

The following example illustrates the use of the process for removing iron from bauxite.

A bauxite from Weipa, Queensland, containing approximately 7% iron was pelletized into 9 mm cores containing ore, sodium chloride and char in the weight ratio 1 : 0.4 : 0.4. A 2 mm thick coating of 1.2 parts of char to 1 part of South Bulli coal was applied to the cores.

The pellets were reduced in a laboratory shaft kiln with a residence time of 90 minutes at 1,130°C. The atmosphere added to the kiln initially comprised 70% nitrogen, 28% carbon dioxide and 2% hydrogen chloride.

The reduced pellets were crushed and the excess carbon removed. After removal of iron by magnetic separation the residue was a white powder containing 93% of the initial alumina values and no detectable iron.

EXAMPLE 16

The following example illustrates the use of the invention for treatment of iron sands.

A sample of New Zealand iron sand containing 63.2% iron was pelletized into 9 mm cores containing 1 part iron sand, 0.3 parts of char and 0.4 parts of sodium chloride by weight. A 2 mm thick coating containing 1.2 parts of char to 1 part of South Bulli coal was applied to the cores.

The pellets were reduced in a laboratory shaft furnace with a residence time of 90 minutes at 1,130°C in an atmosphere initially comprising 70% nitrogen and 30% carbon dioxide.

Samples of reduced pellets were mounted in epoxy resin sectioned and polished. Microscopic examination showed complete metallization of the iron values while the gangue was present mainly as a silicate slag.

EXAMPLE 17

This example illustrates the effect of coal quality. Pellets were prepared using coal from the Wolgan Colliery, in N.S.W., having a proximate analysis of:

| | | |
|---|---|---|
| Inherent moisture | 3.0% | w/w |
| Ash | 10.5% | " |
| Volatile matter | 35.5% | " |
| Fixed carbon | 51.0% | " | and a somewhat higher fluidity than South Bulli coal used in Example 9. With a variety of skin compositions and at different rates of coking it was observed that the coked skins were more porous and swollen than in the equivalent pellets made with South Bulli coal; at slower rates of coking they were weaker than the corresponding South Bulli pellets and at faster coking rates more prone to skin disruption.

The deleterious effect of the evolution of large quantities of volatile material during coke formation was further demonstrated by preparing pellets coated with a mixture of a medium-volatile coking coal from the Tivoli Colliery, in Queensland, having a proximate analysis of:

| | |
|---|---|
| Inherent moisture | 2.0% |
| Ash | 19.4% |
| Volatile matter | 28.2% |
| Fixed carbon | 50.4% | and a high-volatile, non-coking coal from the Collie Colliery, in Western Australia, having a proximate analysis of:

| | | |
|---|---|---|
| Inherent moisture | 14.3% | w/w |
| Ash | 2.0% | " |
| Volatile matter | 39.0% | " |
| Fixed carbon | 44.7% | " | in the ratio of 1 : 1 (by weight). During the coke-forming process the non-coking coal would have acted as an inert diluent, other than its contribution to the evolution of volatiles. Compared with equivalent pellets made from South Bulli coal and char they were much weaker with markedly more swollen and porous skins.

The effect of the reduction in fluidity as a consequence of slow aerial oxidation was demonstrated by comparing pellets made with "fresh" South Bulli coal with equivalent pellets made with the same coal after storing for 7 weeks and longer. Strong pellets could be made, coking at a heating rate of 6°C/min, from fresh coal incorporating at least 30% of inert material whereas pellets made from coal stored from 7–8 weeks were strong only when the proportion of inert was reduced to 10% or less (depending on the fineness of the coal). The phenomenon was further demonstrated by coking pellets coated with pure coal at a fast rate, when pellets made with the older coal showed the same degree of skin disruption and swelling as those made when the coal was fresh but comparable deformation, indicative of transition through a highly plastic stage, did not occur.

EXAMPLE 18

The following examples illustrates the use of the invention to give adequate strength to pellets for the treatment of low grade chromite ores. A sample of chromium bearing ore containing 49% $Cr_2O_3$ and 20.3% FeO was crushed to 95% — 100 mesh B.S.S. and pelletized into 9 mm cores containing ore, sodium chloride, and graphite in the weight ratio 1 : 0.01 : 0.04. A 2 mm thick coating containing 1.2 parts of brown coal char to 1 part of South Bulli coal was applied to the cores.

The pellets were reduced in a laboratory shaft furnace with a residence time of 90 minutes at 1,200°C in an atmosphere initially comprising 70% nitrogen and 30% carbon dioxide. Samples of the reduced pellets were mounted in epoxy resin sectioned and polished. Microscopic examination showed the bulk of the iron values to be metallized in a form suitable for extraction.

We claim:

1. A coated pellet comprising a core consisting of a suitable mixture for a metallurgical reductive process and a coke matrix skin substantially surrounding the core, the core comprising an ilmenite ore, solid carbonaceous material capable of reducing the iron oxide in ilmenite to metallic iron and a flux chosen from the group consisting of alkali metal chlorides, alkaline earth metal chlorides and mixtures thereof; the weight ratio of ore to flux being in the range from about 5:1 to 1.2:1 the diameter of the core being in the range from 0.25 to 5 cms and the ratio of diameter of core to thickness of coke matrix skin being in the range from 10:1 to 10:3 said skin being in such a state that it does not crack or collapse under thermal stress thereby retaining its physical identity during reductive roasting, and the flux does not exude from the pellet.

2. A pellet according to claim 1 wherein the ilmenite and solid carbonaceous material are in the weight ratio between 1 : 01 to 1 : 03 and the weight ratio of flux to ilmenite is in the ratio 1 : 5 to 1 : 1.2.

3. A pellet according to claim 2 wherein the weight ratio of ilmenite to solid carbonaceous material is between 1 : 0.12 and 1 : 0.25 and the weight ratio of flux to ilmenite is between 1 : 2.5 and 1 : 1.4.

4. A pellet according to claim 2 wherein the flux is chosen from the group consisting of sodium chloride, potassium chloride and mixtures thereof.

5. In the process for reducing ilmenite ore by reductive heating of pellets containing the ore, the improvement which comprises utilizing, as the pellets, coated pellets comprising a core and a coke matrix skin substantially surrounding the core, said core comprising ore, solid carbonaceous material capable of reducing the iron oxide in ilmenite to metallic iron, and a flux chosen from the group consisting of alkali metal chlorides, alkaline earth metal chlorides and mixtures thereof; the weight ratio of ore to flux being in the range from about 5:1 to 1.2:1 the diameter of the core being in the range from 0.25 to 5 cms and the ratio of diameter of core to thickness of coke matrix skin being in the range from 10:1 to 10:3 said skin being in such a state that it does not crack or collapse under thermal stress thereby retaining its physical identity during reductive roasting, and the flux does not exude from the pellet, said pellets retaining their pellet form during said reductive heating and having a reduced tendency to be crushed or to coalesce.

6. A process of making the coated pellets according to claim 5 wherein a core material consisting ore, solid carbonaceous material and the flux is coated with coke precursor and the coated pellet is heated under coking conditions.

7. A process according to claim 6 wherein the coke precursor comprises a coking coal in admixture with inerts.

8. A process according to claim 7 wherein the inerts are chosen from the group consisting of coke, coal chars and graphite.

9. A process according to claim 7 wherein the weight ratio of coking coal to inerts is in the range from 1 : 2 w/w to 9 : 1 w/w.

10. A process according to claim 6 wherein the pellet is coked at a rate of heating between 50° to 200°C per minute and the coke precursor comprises a mixture consisting of from 50 to 60 w/w % coking coal and from 40 to 50 w/w % of inerts.

11. A process according to claim 6 wherein the pellet is coked at a slow rate of heating between 5° and 25°C per minute and the coke precursor comprises a mixture consisting of from 70 to 90 w/w % of coking coal and from 10 to 30 w/w % of inerts.

* * * * *